United States Patent
Waddleton (10) Patent No.: US 10,793,256 B2
(45) Date of Patent: Oct. 6, 2020

(54) PROPELLER BLADE ANGLE CONTROL SYSTEM

(71) Applicant: PRATT & WHITNEY CANADA CORP., Longueuil (CA)

(72) Inventor: David Waddleton, Candiac (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 507 days.

(21) Appl. No.: 15/612,522

(22) Filed: Jun. 2, 2017

(65) Prior Publication Data

US 2018/0072402 A1 Mar. 15, 2018

Related U.S. Application Data (60) Provisional application No. 62/393,339, filed on Sep. 12, 2016.

(51) Int. Cl.
| | |
|---|---|
| *B64C 11/38* | (2006.01) |
| *B64C 11/40* | (2006.01) |
| *B64C 11/42* | (2006.01) |
| *F01M 5/00* | (2006.01) |
| *F02C 3/04* | (2006.01) |

(52) U.S. Cl.
CPC ............ *B64C 11/38* (2013.01); *B64C 11/385* (2013.01); *B64C 11/40* (2013.01); *B64C 11/42* (2013.01); *F01M 5/002* (2013.01); *F02C 3/04* (2013.01); *F05D 2220/323* (2013.01)

(58) Field of Classification Search
CPC ....... B64C 11/38; B64C 11/385; B64C 11/40; B64C 11/42
See application file for complete search history.

(56) References Cited

U.S. PATENT DOCUMENTS

| | | | | |
|---|---|---|---|---|
| 2,507,671 A | * | 5/1950 | May ........................ | B64C 11/42 416/48 |
| 2,891,627 A | * | 6/1959 | Ditmer .................... | B64C 11/40 416/94 |
| 3,004,608 A | * | 10/1961 | Pond ....................... | B64C 11/40 416/47 |
| 5,174,718 A | * | 12/1992 | Lampeter ................ | B64C 11/38 416/157 R |
| 5,186,608 A | * | 2/1993 | Bagge ..................... | B64C 11/38 416/147 |

(Continued)

FOREIGN PATENT DOCUMENTS

EP 0507860 10/1992

OTHER PUBLICATIONS

Extended European Search Report, European Application No. 17190710.8, dated Dec. 11, 2017.

*Primary Examiner* — Brian P Wolcott
(74) *Attorney, Agent, or Firm* — Norton Rose Fulbright Canada LLP (57) ABSTRACT

A control circuit for changing the angle of propeller blades includes a propeller pitch change mechanism, and a fixed-displacement pump providing the supply of oil from an engine oil return system. A valve has an outlet port to direct oil from a cavity of the valve, and a pitch port in fluid communication with the pitch change mechanism. A spool of the valve is operable between a first position and a second position to respectively open and close the outlet port, and direct oil flow away from or to the pitch change mechanism.

12 Claims, 5 Drawing Sheets

(56) References Cited

U.S. PATENT DOCUMENTS

| | | | |
|---|---|---|---|
| 7,118,336 B2* | 10/2006 | Waddleton | B64C 11/38 416/1 |
| 9,169,783 B2* | 10/2015 | Kleckler | F02C 9/58 |
| 2005/0135929 A1 | 6/2005 | Waddleton | |
| 2013/0323050 A1 | 12/2013 | Kleckler | |
| 2017/0361919 A1* | 12/2017 | Waddleton | B64C 11/38 |
| 2019/0092453 A1* | 3/2019 | Hoemke | B64C 11/385 |

* cited by examiner

FIG. 1

PROPELLER BLADE ANGLE CONTROL SYSTEM

CROSS-REFERENCE TO RELATED APPLICATIONS

The present application claims priority on U.S. Provisional Patent Application No. 62/393,339 filed Sep. 12, 2016, the entire content of which is incorporated by reference herein.

TECHNICAL FIELD

The application relates generally to gas turbine engines and, more particularly, to turboprop engines.

BACKGROUND

Turboprop gas turbine engines for aircraft which use propellers to provide propulsion have blade angle control systems to control the pitch of the propeller blades. The blade angle control system is actuated by hydraulic fluid which is supplied under pressure by a pump.

The pump used for such systems is sized to meet the largest load requirements of the blade angle control system. The hydraulic fluid flow requirements for these larger loads are significantly higher than the flow requirements of the blade angle control system during steady-state operation. The pump therefore often supplies more fluid to the blade angle control system than is required during steady-state operation. A significant amount of this excess fluid is diverted away from the blade angle control system toward the pump's inlet. This can however result in an undesirable increase in the temperature of the oil supplied to the pump.

SUMMARY

There is accordingly provided an oil system of a turboprop gas turbine engine having a propeller of an aircraft, the propeller having a plurality of variable pitch propeller blades, the oil system comprising: an engine oil return system having a supply of oil; and a propeller blade angle control circuit communicating with the engine oil return system, including: a propeller pitch change mechanism; a fixed-displacement pump communicating between the propeller pitch change mechanism and the supply of oil; and a valve disposed downstream of the pump, the valve having a valve body with a cavity therein, the valve body including an outlet port, an inlet port, and a pitch port, the inlet port fluidly communicating with the pump, the outlet port fluidly communicating with the engine oil return system via an oil cooling line, and the pitch port fluidly communicating with the propeller pitch change mechanism, the valve including a spool within the cavity displaceable between a first position and a second position within the valve body; wherein in the first position, the spool permits communication through the outlet port to the oil cooling line, and in the second position the spool substantially blocks the outlet port to permit oil to flow through the pitch port to the propeller pitch change mechanism.

There is also provided a method of supplying oil to a propeller pitch change mechanism, comprising: pumping the oil at a constant flow rate to a valve positioned upstream of the propeller pitch change mechanism; and controlling access of the pumped oil to an oil cooling leakage path extending from the valve to an engine oil return system, including directing the oil from the valve along the oil cooling leakage path to the engine oil return system to cool the oil, and blocking access to the oil cooling leakage path with the valve to direct the oil toward the propeller pitch change mechanism to modify an angle of propeller blades.

There is further provided a propeller blade angle control circuit, comprising: a propeller pitch change mechanism; a fixed-displacement pump located upstream of the propeller pitch change mechanism and providing a supply of oil from an engine oil return system to the propeller pitch change mechanism; and a valve disposed between the pump and the propeller pitch change mechanism, the valve having a valve body with a cavity therein, the valve body including an outlet port, an inlet port, and a pitch port, the inlet port fluidly communicating with the pump, the outlet port fluidly communicating with the engine oil return system via an oil cooling line, and the pitch port fluidly communicating with the propeller pitch change mechanism, the valve including a spool within the cavity displaceable between a first position and a second position within the valve body; wherein in the first position, the spool permits communication through the outlet port to the oil cooling line, and in the second position the spool substantially blocks the outlet port to permit oil to flow through the pitch port to the propeller pitch change mechanism.

BRIEF DESCRIPTION OF THE DRAWINGS

Reference is now made to the accompanying figures in which.

DETAILED DESCRIPTION

Figure 1:
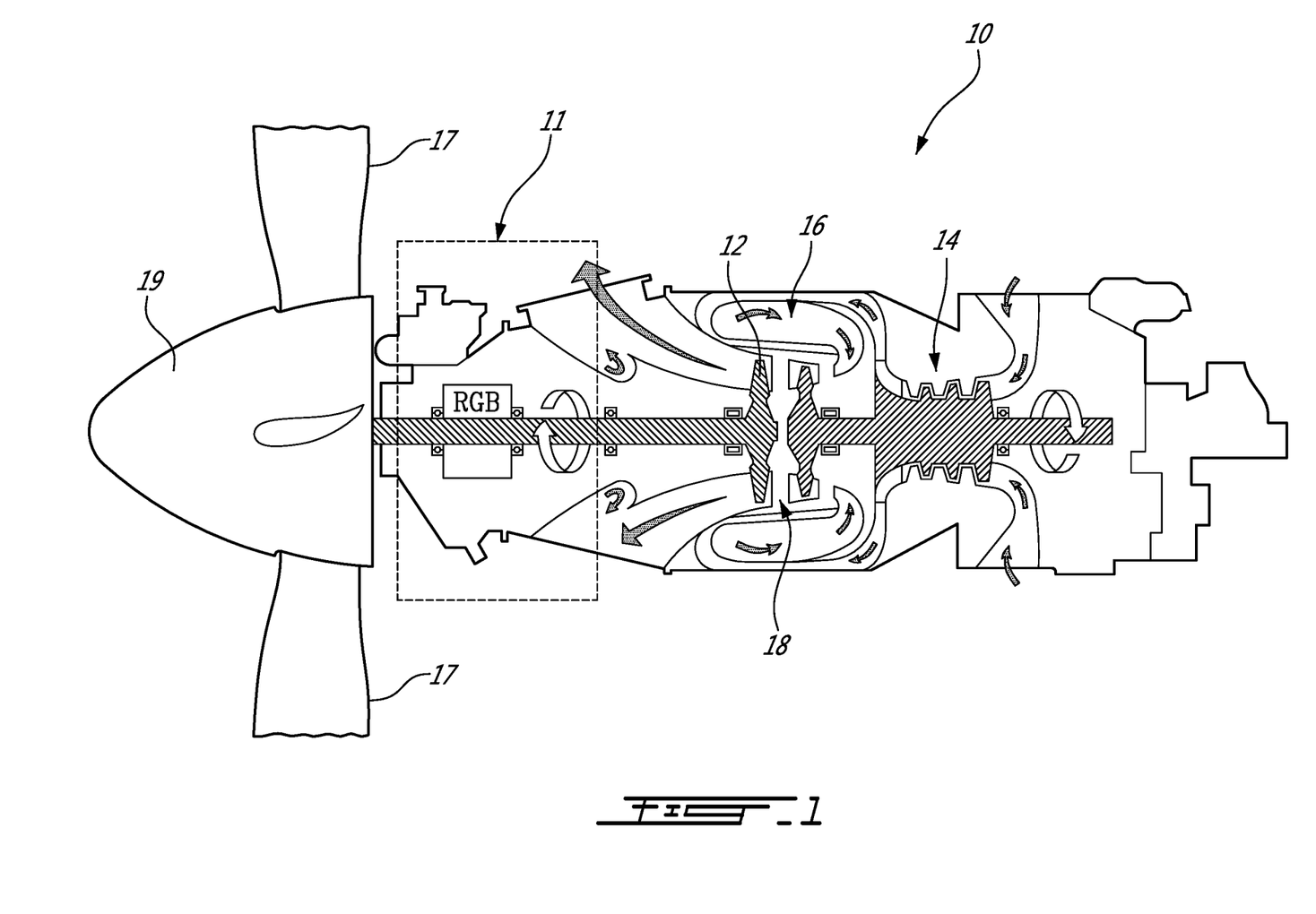
FIG. 1 is a schematic cross-sectional view of a gas turbine engine.

FIG. 1 illustrates a gas turbine engine 10 of a type preferably provided for use in subsonic flight, generally comprising in serial flow communication a compressor section 14 for pressurizing ambient air, a combustor 16 in which the compressed air is mixed with fuel and ignited for generating an annular stream of hot combustion gases, and a turbine section 18 for extracting energy from the combustion gases. A low pressure (LP) turbine 12 drives, via a reduction gear box (RGB), a propeller 19 having propeller blades 17 for providing thrust to the aircraft. An oil system 11 is provided for the gas turbine engine 10, and provides lubrication for the rotating components of the gas turbine engine 10, which include bearings for the rotating turbomachinery (e.g. the compressors, turbines, shafts, and gears), the RGB and the propeller control systems, etc.

Figure 2:
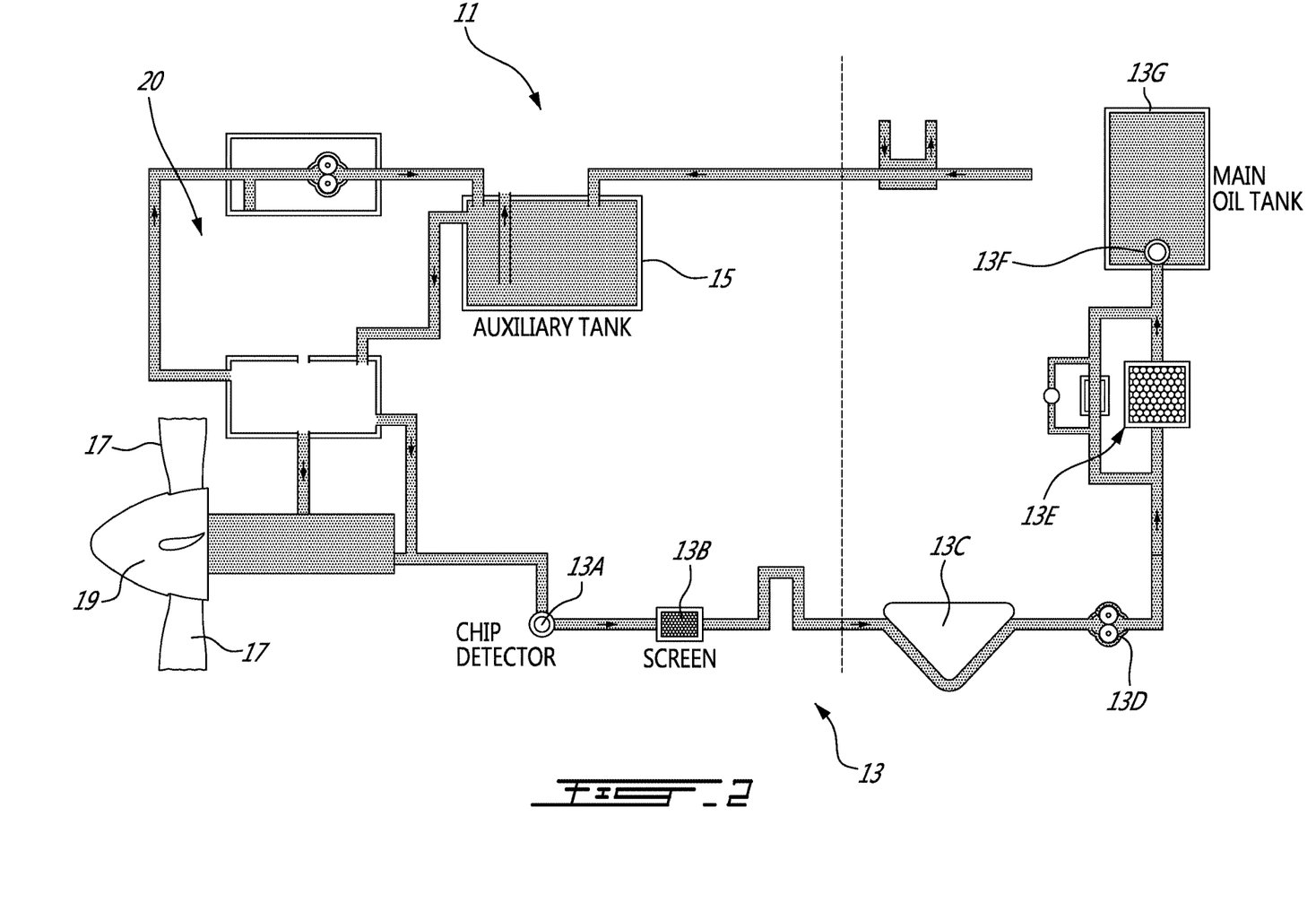
FIG. 2 is a schematic view of an oil system for the gas turbine engine of FIG. 1, the oil system having a propeller blade angle control circuit.

Referring to FIG. 2, the oil system 11 can include any number of components, and any arrangement of components, to provide lubrication to the gas turbine engine 10. One such component, an engine oil return system 13, is shown in the depicted embodiment. The engine oil return system 13 receives used or scavenged oil from the lubricated components of the gas turbine engine, filters and cools the reclaimed oil, and pressurizes it for recirculation to the rotating turbomachinery. In the depicted embodiment, the engine oil return system 13 includes a chip detector 13A to detect the presence of unacceptably-large debris in the oil returning from the propeller 19. The oil and any debris is then filtered with a screen 13B, and then subjected to anti-icing procedures at an anti-icing station 13C. A scavenge pump 13D pressurizes the oil and sends it through another filter 13E before passing through another chip detector 13F before being collected in a main oil tank 13G. From the main oil tank 13G, the oil can be pumped with a supply pump to any number of different components of the oil system 11. For example, oil can be pumped from the supply pump to an auxiliary oil tank 15. The engine oil return system 13 can have more, fewer, and/or different components than those schematically depicted or described above.

In the depicted embodiment, the auxiliary oil tank 15 serves as a source of oil for a propeller blade angle control circuit 20. The oil supplied to the propeller blade angle control circuit 20 (or "control circuit 20") provides hydraulic power to the propeller control circuit 20, allowing it to control the pitch of the variable-pitch propeller blades 17. The control circuit 20 is thus integrated with, and supplied by, the oil system 11. By being integrated with the oil system 11 of the gas turbine engine, the control circuit 20 is able to use the oil provided by oil system 11 to control the pitch of the propeller blades 17. The oil of the oil system 11 therefore provides a lubricating function, and an actuating function by providing hydraulic power to the control circuit 20.

Figure 3:
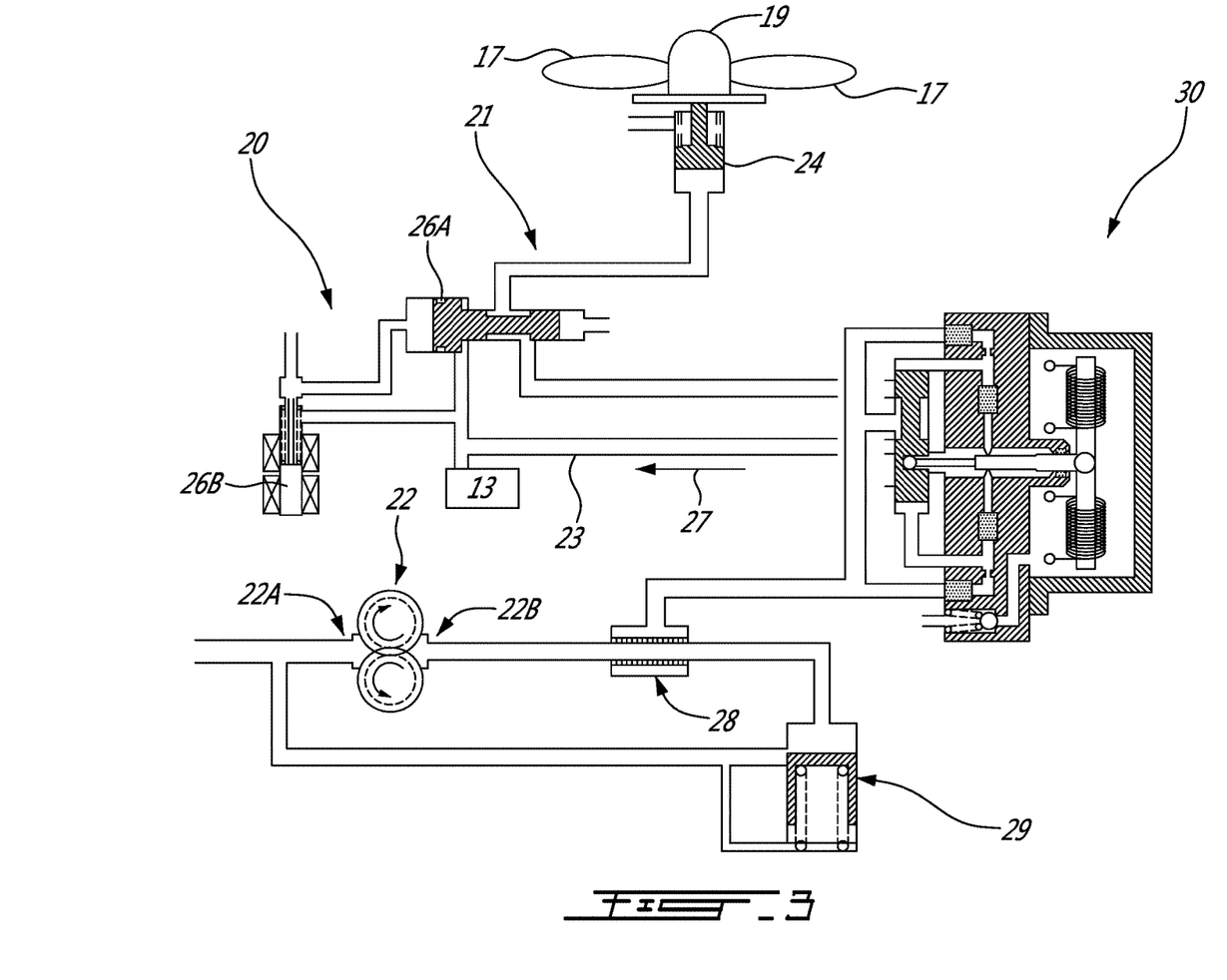
FIG. 3 is a schematic view of the propeller blade angle control circuit of FIG. 2 having a valve.

The control circuit 20 is an assembly of fluid lines, connectors, valves, and other components that supply oil to the mechanisms that change the pitch of the propeller blades 17. In the embodiment of FIG. 3, the control circuit 20 has a propeller pitch change mechanism 21 to effect changes in the pitch of the propeller blades 17, a valve 30 which modulates the flow of oil to the propeller pitch change mechanism 21, a fixed-displacement pump 22 which provides oil to the valve 30, and an oil cooling line 23 which helps to divert excess oil to the engine oil return system 13.

The propeller pitch change mechanism 21 modulates the supply of oil that is used to modify the angle of the propeller blades 17. It can thus have any suitable component, and any suitable arrangement of components, to achieve this functionality. More particularly, the pitch change mechanism 21 may include different actuators, valves, and other components to adjust the angle of the propeller blades 17. In the depicted embodiment, the pitch change mechanism 21 has a propeller pitch change actuator 24 which can effect fine and coarse changes in propeller blade 17 pitch. The propeller pitch change actuator 24 is mechanically coupled to the propeller 19 so that when the oil pressure is at or near an activation pressure, it drives the propeller pitch change actuator 24 to adjust the blade pitch of the propeller blades 17. The pitch change mechanism 21 also has a feather valve 26A supplied with oil by the valve 30, and a feather solenoid 26B. The components of the pitch change mechanism 21 return oil to the engine oil return system 13. The pitch change mechanism 21 can have more, fewer, and/or different components than those depicted or described above.

The fixed-displacement pump 22 outputs a substantially constant flow rate of oil to the valve 30. The pump 22 is therefore located within the control circuit 20 upstream of both the valve 30 and the pitch change mechanism 21, and acts as a dedicated source of constant hydraulic power. It is typically sized to provide sufficient hydraulic power to satisfy the largest loads of the pitch change mechanism 21. The pump 22 is supplied at a pump inlet 22A with oil from a component of the oil system 11, such as from the engine oil return system 13, and pumps the oil via a pump outlet 22B.

Still referring to FIG. 3, the oil cooling line 23 is a return line which sends excess oil from the valve 30 to the engine oil return system 13. The oil cooling line 23 can therefore be any hose, tube, pipe, or other similar conduit that extends from the valve 30 to the engine oil return system 13. It will be appreciated that the oil cooling line 23 may be physically spaced from the valve 30 provided that it is fluid communication therewith to receive oil therefrom.

The oil cooling line 23 therefore diverts excess oil away from the pump 22 and the pitch change mechanism 21. In so doing, the oil cooling line 23 defines an oil leakage path 27 that leads to the engine oil return system 13. "Excess" oil is oil that is supplied by the fixed-displacement pump 22 but that is not required by the pitch change mechanism 21. Excess oil is typically available during steady-state operation of the propeller 19 (e.g. flight idle, ground idle, etc.), when there is little or no need to change the pitch of the propeller blades 17. Rather than returning this relatively hot excess oil to the pump inlet 22A of the pump 22, where it is circulated to the pitch change mechanism 21 and valve 30, as is done in some conventional blade angle control systems, the oil cooling line 23 allows the excess oil to be diverted, directly or indirectly, to the engine oil return system 13 where it can be cooled using any of the techniques used to cool the oil being returned from other parts of the oil system 11 (e.g. air-oil heat exchanger, fuel-oil heat exchanger, circulation, etc.). The oil cooling line 23 therefore helps to divert relative hot oil away from the pump 22, pitch change mechanism 21 and valve 30, thereby reducing the likelihood of damage to one or more of these components caused by overheating. For example, it is known that relative hot oil (i.e. in excess of 275° F.) may exceed the temperature limits of some of the elastomers used in seals for the pump 22, or for the coils in the valve 30.

Still referring to FIG. 3, the valve 30 controls the pressure of the oil supplied to the pitch change mechanism 21, and also controls the amount of oil that is leaked along the leakage path 27 to the engine oil return system 13. In the depicted embodiment, the valve 30 is "electrohydraulic" in that it uses a hydraulic fluid source and is electronically controlled via a suitable electronic control unit. The valve 30 is located between the pump 22 and the pitch change mechanism 21. In the depicted embodiment, the valve 30 is shown downstream of the pump 22, downstream of a wash screen 28, and downstream of a flow regulator 29 which helps to maintain a specified pressure downstream of the pump 22. Other configurations are possible. The valve 30 is fluidly connected to the oil cooling line 23, and is operable between a first position and a second position to selectively allow access to or block, respectively, the leakage path 27 defined by the oil cooling line 23 that leads to the engine oil return system 13.

In the first position, the valve 30 allows access to the leakage path 27 and directs oil through the oil cooling line 23 and along the leakage path 27 toward the engine oil return system 13 so that the oil can be cooled. In this position, where oil is diverted along the leakage path 27, the valve 30 is regulating the pressure of the oil supplied to the pitch change mechanism 21 and diverting excess oil toward the engine oil return system 13. The valve 30 will typically, but not exclusively, operate in the first position during steady-state operation of the propeller 19. During steady-state operation, there is less of a demand from the pitch change mechanism 21 responsible for changing the angle of the propeller blades 17. Therefore, "steady-state" refers to relatively little or no demand for hydraulic power from the downstream pitch change mechanism 21. A cooling oil flow diversion can thus be provided by the valve 30 during steady-state operation.

In the second position, the valve 30 blocks access to the leakage path 27. Most if not all of the oil is thus instead directed toward the pitch change mechanism 21 to effect changes in the angle of the propeller blades 17. In this position, where oil is prevented from being diverted along the leakage path 27, substantially all of the hydraulic power supplied by the pump 22 is available for the pitch change mechanism 21 to make the required changes in propeller blade 17 pitch. This is in contrast to some conventional blade angle control systems, which allow leaking flow back to the engine oil return even during high load maneuvers. The valve 30 will typically, but not exclusively, operate in the second position during transient operation of the propeller 19. During transient operation, there is a relatively high demand for hydraulic power. Some examples of transient flow regimes include accommodating for large changes in engine power, moving the engine into or out of reverse, or feathering or unfeathering the propeller 19. Therefore, "transient" refers to relatively high demand for hydraulic power from the downstream pitch change mechanism 21.

Figure 4:
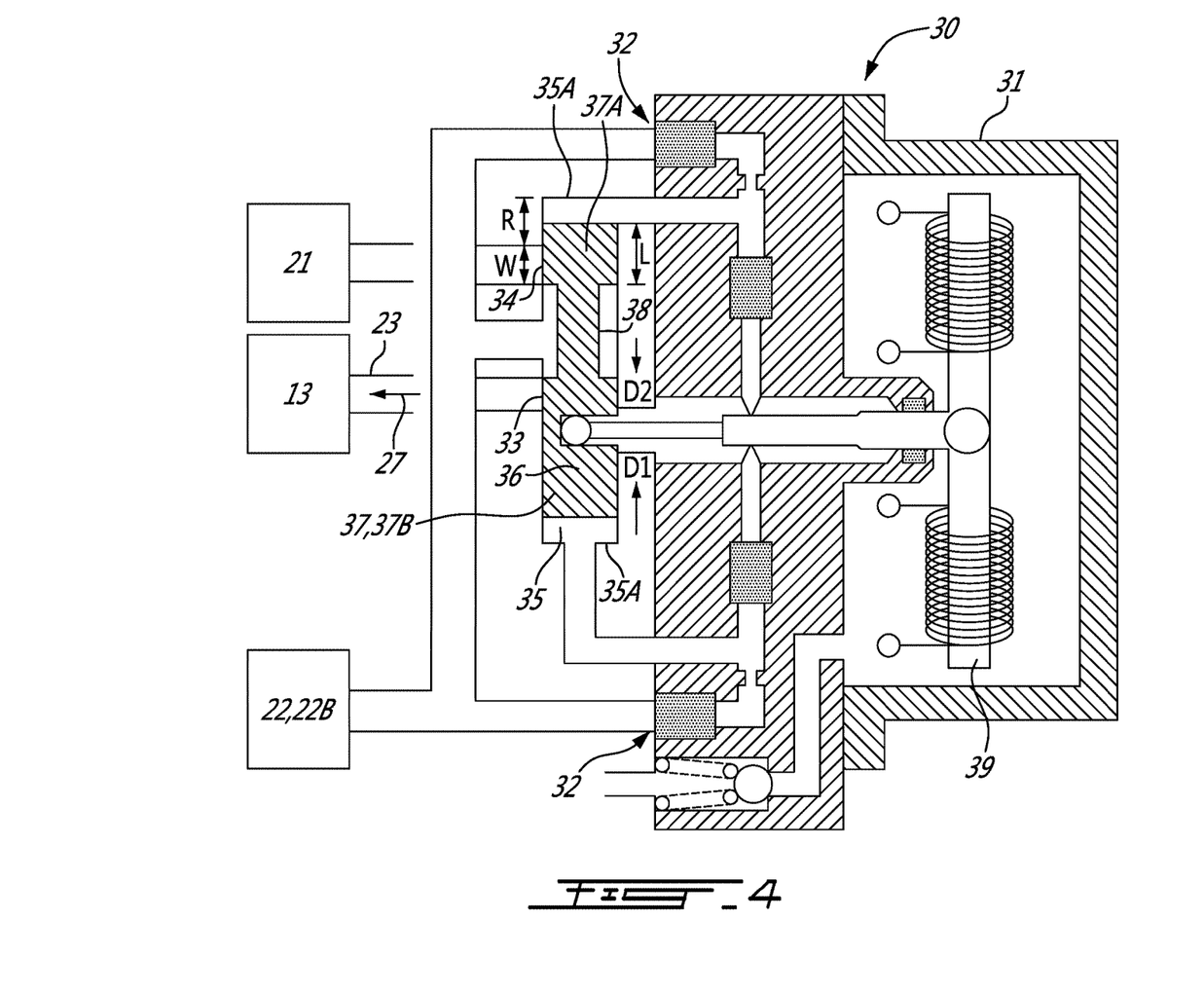
FIG. 4 is an enlarged view of the valve of the propeller blade angle control circuit of FIG. 3.

Referring to FIG. 4, the valve 30 is "electrohydraulic" in that it uses a hydraulic fluid source and is electronically controlled via a suitable electronic control unit. In the depicted embodiment, the valve 30 has a valve body 31 which forms the corpus of the valve 30 and provides structure thereto. The valve body 31 has multiple openings therein, where each opening defines a port of the valve 30. In the depicted embodiment, the valve body 31 has the following four ports: two inlet ports 32 which receive a supply of pressurized oil from the pump outlet 22B, an outlet port 33 in fluid communication with the oil cooling line 23 to direct oil from the valve body 31 along the oil leakage path 27 to the engine oil return system 13 for cooling, and a pitch port 34 in fluid communication with the pitch change mechanism 21 to direct oil thereat. Each of the ports 32,33,34 communicates with a cavity 35 in the valve body 31. Oil enters the cavity 35 of the valve body 31 via the inlet ports 32, and exits the cavity 35 via the outlet port 33 or the pitch port 34.

The valve body 31 also includes a spool 36 located within the cavity 35 and displaceable within the cavity 35 to block and expose one or more of the ports 32,33,34. The spool 36 is displaceable along opposed directions D1 and D2 between two end walls 35A of the cavity 35. In the depicted embodiment, the spool 36 has two lands 37 and a single groove 38. It will be appreciated that other configurations for the spool 36 are possible. A first land 37A is disposed adjacent to the pitch port 34 and is abuttable against one of the end walls 35A of the cavity 35. The first land 37A modulates the flow of oil through the pitch port 34. A second land 37B is disposed adjacent to the outlet port 33 and is abuttable against the other end wall 35A of the cavity 35. The second land 37B modulates the flow of oil through the outlet port 33 and along the oil leakage path 27. In the depicted embodiment, the valve 30 is an electrohydraulic servo valve and thus has an electrically-responsive servo 39 that cooperates with the spool 36 to allow it to slidingly displace within the cavity 35 in response to an electrical signal, for example. The valve 30 of FIG. 3 is therefore a two stage, four-port valve 30. It will be appreciated that other types of valves 30 are within the scope of the present disclosure. For example, the valve 30 can have more or fewer ports. Similarly, the valve 30 can have an additional stage.

Still referring to FIG. 4, the spool 36 is operable between the first and second positions. In the first position, the pitch change mechanism 21 is typically operating in steady-state, and the spool 36 permits at least the outlet port 33 to direct at least some of the supply of oil through the oil cooling line 23 along the oil leakage path 27 to the engine oil return system 13 for cooling the oil. The outlet port 33 therefore defines a flow path from the pump outlet to the engine oil return system 13 to provide a cooling flow. To achieve this operating condition of the valve 30 in the first position, the first and second lands 37A,37B of the spool 36 are displaced in the direction D2 toward one of the end walls 35A of the cavity 35. The displacement of the second land 37B at least partially unblocks the outlet port 33 to allow oil from the cavity 35 to flow therethrough. In the second position, the pitch change mechanism 21 is typically operating in transient, and the spool 36 substantially blocks the outlet port 33, thereby blocking access to the oil leakage path 27. The oil is therefore directed toward the pitch change mechanism 21 via the pitch port 34 to modify the pitch angle of the propeller blades. To achieve this operating condition of the valve 30 in the second position, the first and second lands 37A,37B are displaced in the direction D1 toward one of the end walls 35A of the cavity 35. The displacement of the first land 37A at least partially unblocks the pitch port 34 to allow oil from the cavity 35 to flow therethrough. In the depicted embodiment, the displacement of the second land 37B blocks the outlet port 33 to prevent oil from the cavity 35 from flowing therethrough.

During transient operation of the pitch change mechanism 21, the spool 36 can increase an opening of the pitch port 34 while simultaneously blocking the outlet port 33 to maximize the supply of oil to the pitch change mechanism 21. Therefore, during transient operation, when the second land 37B is moving to block the outlet port 33, the first land 37A is also moving to increase the opening of the pitch port 34. By controlling the movement or phasing of the lands 37A, 37B between the outlet and pitch ports 33,34, and by controlling the moment at which the outlet port 33 is blocked, the cooling flow created during steady-state operation begins to disappear when larger blade angle demands are made by the pitch change mechanism 21 during transient operation.

In the depicted embodiment, the spool 36 is not capable of fully blocking the pitch port 34 such that the pitch port 34 always remains at least partially open. This configuration can be achieved in different ways. In the depicted embodiment, a length L of the first land 37A is selected to be less than the combination of a distance R between the nearest end wall 35A of the cavity 35 and the pitch port 34, and a width/diameter W of the opening of the pitch port 34. Oil can therefore always be directed to the pitch change mechanism 21. Since the pitch port 34 is the port of the valve 30 that helps to control the pressure sensed by the pitch change mechanism 21, it may be desired that it never be completed blocked off. Indeed, the spool 36 and the first land 37A can be displaceable within the cavity 35 to modulate or control the size of an opening of the pitch port 34. This control of the opening of the pitch port 34 helps to finely regulate the oil pressure supplied to the pitch change mechanism 21.

In the first position, the spool 36 can keep both the outlet port 33 and the pitch port 34 open. Therefore, during steady state operation, the position of the lands 37A,37B within the cavity 35 is such that oil can directed through both the outlet and pitch ports 33,34. In such an embodiment, oil is directed along the oil leakage path 27 toward both the engine oil return system 13, and towards the pitch change mechanism 21. The oil is thus able to flow to both destinations simultaneously.

Figure 5:
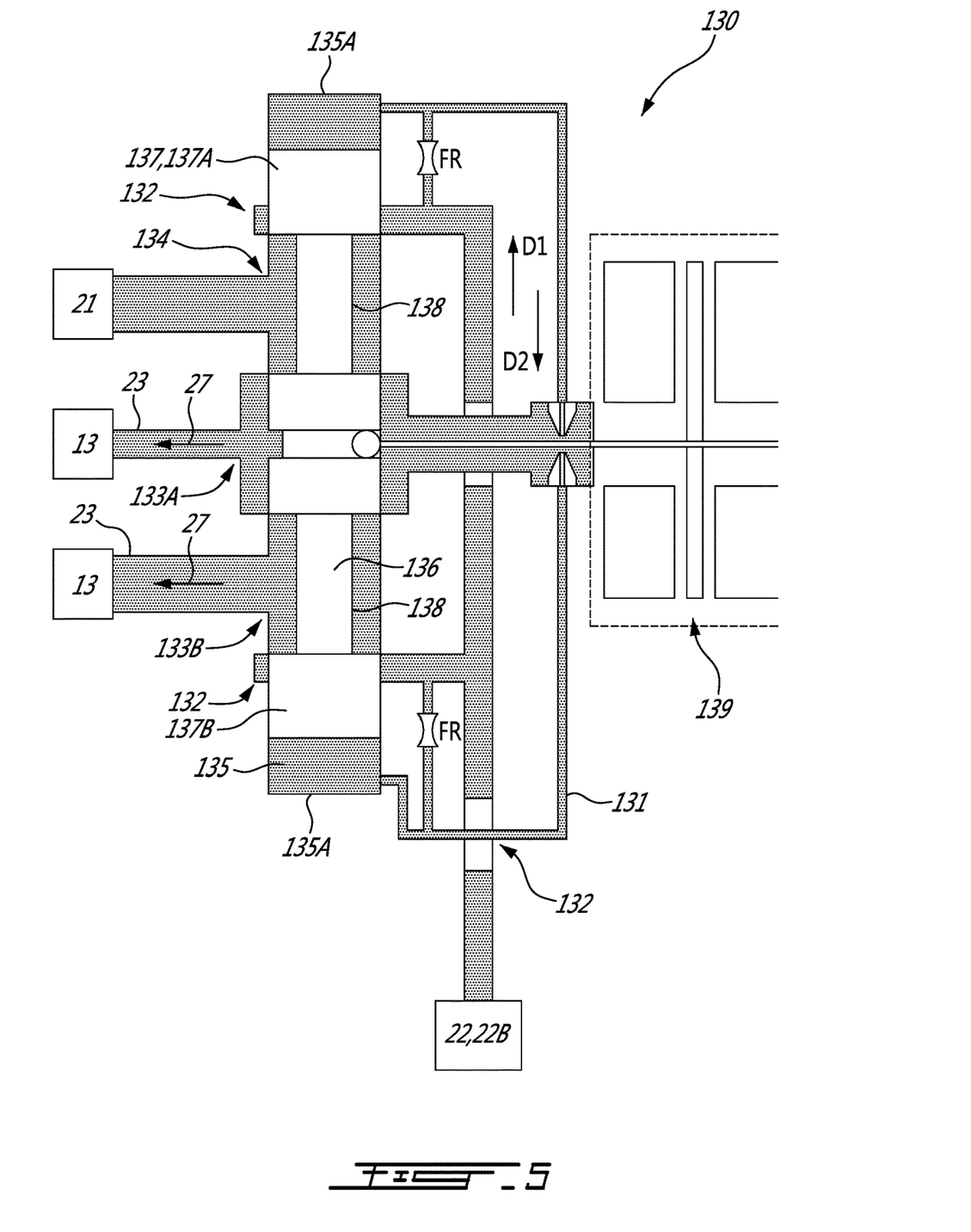
FIG. 5 is an enlarged view of a valve of the propeller blade angle control circuit disclosed herein.

Another embodiment of the valve 130 is shown in FIG. 5. The valve 130 is "electrohydraulic" in that it uses a hydraulic fluid source and is electronically controlled via a suitable electronic control unit. In the depicted embodiment, the valve 130 has a valve body 131 which forms the corpus of the valve 130 and provides structure thereto. The valve body 131 has multiple openings therein, where each opening defines a port of the valve 130. In the depicted embodiment, the valve body 131 has the following ports: multiple inlet ports 132 which receive a supply of pressurized oil from the pump outlet 22B, a first outlet port 133A in fluid communication with the oil cooling line 23 to direct oil from the valve body 131 along the oil leakage path 27 to the engine oil return system 13 for cooling, a second outlet port 133B in fluid communication with the oil cooling line 23 to direct oil from the valve body 131 along the oil leakage path 27 to the engine oil return system 13 for cooling, and a pitch port 134 in fluid communication with the pitch change mechanism 21 to direct oil thereat. Each of the ports 132,133A, 133B,134 communicates with a cavity 135 in the valve body 131. Oil enters the cavity 135 of the valve body 131 via the inlet ports 132, and exits the cavity 135 via the first and second outlet ports 133A,133B, or via the pitch port 134.

The valve body 131 also includes a spool 136 located within the cavity 135 and displaceable within the cavity 135 to block and expose one or more of the ports 132,133B,134. The spool 136 is displaceable along opposed directions D1 and D2 between two end walls 135A of the cavity 135. In the depicted embodiment, the spool 136 has two lands 137 and a two grooves 138. It will be appreciated that other configurations for the spool 136 are possible. A first land 137A is disposed adjacent to the pitch port 134 and is abuttable against one of the end walls 135A of the cavity 135. The first land 137A modulates the flow of oil through the pitch port 134. A second land 137B is disposed adjacent to the second outlet port 133B and is abuttable against the other end wall 135A of the cavity 135. The second land 137B modulates the flow of oil through the second outlet port 133B. In the depicted embodiment, the valve 130 is an electrohydraulic servo valve and thus has an electrically-responsive torque motor 139 that cooperates with the spool 136 to allow it to slidingly displace within the cavity 135 in response to an electrical signal, for example. The valve 130 of FIG. 5 is therefore a two stage, five-port valve 130.

Still referring to FIG. 5, the first outlet port 133A remains open at all times. Oil can therefore always be directed through the first outlet port 133A and toward the engine oil return system 13. The spool 136 is operable between the first and second positions. In the first position, the pitch change mechanism 21 is typically operating in steady-state, and the spool 36 permits both the first and second outlet ports 133A,133B to direct at least some of the supply of oil through the oil cooling line 23 along the oil leakage path 27 to the engine oil return system 13 for cooling the oil. The first and second outlet ports 133A,133B therefore define a flow path from the pump outlet to the engine oil return system 13 to provide a cooling flow. To achieve this operating condition of the valve 130 in the first position, the first and second lands 137A,137B of the spool 136 are displaced in the direction D2 toward one of the end walls 135A of the cavity 135. The displacement of the second land 137B at least partially unblocks the second outlet port 133B to allow oil from the cavity 135 to flow therethrough.

In the second position, the pitch change mechanism 21 is typically operating in transient, and the spool 136 substantially blocks the second outlet port 133B, thereby blocking access to the oil leakage path 27 via the second outlet port 133B. The first outlet port 133A remains open such that a relatively small volume of oil flows through the oil cooling line 23 along the oil leakage path 27 to the engine oil return system 13 for cooling the oil. The majority of the oil is therefore directed toward the pitch change mechanism 21 via the pitch port 134 to modify the pitch angle of the propeller blades. To achieve this operating condition of the valve 130 in the second position, the first and second lands 137A,137B are displaced in the direction D1 toward one of the end walls 135A of the cavity 135. The displacement of the first land 137A at least partially unblocks the pitch port 134 to allow oil from the cavity 135 to flow therethrough. In the depicted embodiment, the displacement of the second land 137B blocks the second outlet port 133B to prevent oil from the cavity 135 from flowing therethrough.

Referring back to FIG. 4, there is also disclosed a method of supplying oil to a propeller pitch change mechanism 21. The method includes pumping the oil at a substantially constant flow rate to a valve 30 positioned upstream of the pitch change mechanism 21, using the pump for example.

The method also includes controlling access of the pumped oil to an oil cooling leakage path 27 extending from the valve 30 to an engine oil return system 13. The control of access to the oil leakage path 27 includes directing the oil from the valve 30 along the oil cooling leakage path 27 to the engine oil return system 13 to cool the oil, and blocking access to the oil cooling leakage path 27 with the valve 30 to direct the oil toward the pitch change mechanism 21 to modify an angle of propeller blades.

In some conventional blade angle control system, a deliberate, continuous leakage path between the exit of the pump and the engine oil return system is used to maintain an acceptable maximum oil temperature within the pump. However, this continuous leakage path will reduce the rate at which the blade angle control system can effectuate changes in blade angle. In some applications, this reduced blade angle change rate may require using a larger pump, which further exacerbates the problem of hot excess oil being returned to the pump inlet.

In contrast, the propeller blade angle control circuit 20 disclosed herein provides access for the oil to a "controlled" leakage path 27 to the engine oil return system 13. The valve 30 provides access to the leakage path 27 only for as long as there are no downstream demands from the pitch change mechanism 21 for hydraulic power. When there is a demand for downstream hydraulic power, the valve 30 can relatively quickly block off the leakage path 27 and allow all available oil to be used for the purposes of effecting changes in the angle of the propeller blades 17. The control circuit 20 disclosed herein therefore provides an oil cooling circuit that does not adversely affect the rate at which the blade angle can be changed.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An oil system of a turboprop gas turbine engine having a propeller of an aircraft, the propeller having a plurality of variable pitch propeller blades, the oil system comprising:
   an engine oil return system having a supply of oil; and
   a propeller blade angle control circuit communicating with the engine oil return system, including:
      a propeller pitch change mechanism;
      a fixed-displacement pump communicating between the propeller pitch change mechanism and the supply of oil; and
      a valve disposed downstream of the pump, the valve having a valve body with a cavity therein, the valve body including an outlet port, an inlet port, and a pitch port, the inlet port fluidly communicating with the pump, the outlet port fluidly communicating with the engine oil return system via an oil cooling line, and the pitch port fluidly communicating with the propeller pitch change mechanism, the valve including a spool within the cavity displaceable between a first position and a second position within the valve body;
   wherein in the first position, the spool permits communication through the outlet port to the oil cooling line, and in the second position the spool substantially blocks the outlet port to permit oil to flow through the pitch port to the propeller pitch change mechanism, the spool displaceable within the cavity to always leave the pitch port at least partially unblocked.

2. The oil system as defined in claim 1, wherein the spool is in the second position during transient operation of the propeller pitch change mechanism.

3. The oil system as defined in claim 2, wherein during transient operation of the propeller pitch change mechanism, the spool increases an opening of the pitch port while simultaneously blocking the outlet port.

4. The oil system as defined in claim 1, wherein the spool is in the first position during steady-state operation of the propeller pitch change mechanism.

5. The oil system as defined in claim 4, wherein in the first position the spool permits oil to flow through the outlet port and the pitch port.

6. The oil system as defined in claim 1, wherein the spool is displaceable within the cavity to modify an opening of the pitch port.

7. The oil system as defined in claim 1, wherein the outlet port includes a first outlet port and a second outlet port, the first outlet port remaining continuously unblocked, the spool in the first position permitting oil to flow through the second outlet port to the oil cooling line, and the spool in the second position substantially blocking the second outlet port.

8. A propeller blade angle control circuit, comprising:
   a propeller pitch change mechanism;
   a fixed-displacement pump located upstream of the propeller pitch change mechanism and providing a supply of oil from an engine oil return system to the propeller pitch change mechanism; and
   a valve disposed between the pump and the propeller pitch change mechanism, the valve having a valve body with a cavity therein, the valve body including an outlet port, an inlet port, and a pitch port, the inlet port fluidly communicating with the pump, the outlet port fluidly communicating with the engine oil return system via an oil cooling line, and the pitch port fluidly communicating with the propeller pitch change mechanism, the valve including a spool within the cavity displaceable between a first position and a second position within the valve body;
wherein in the first position, the spool permits communication through the outlet port to the oil cooling line, and in the second position the spool substantially blocks the outlet port to permit oil to flow through the pitch port to the propeller pitch change mechanism, the spool displaceable within the cavity to always leave the pitch port at least partially unblocked.

9. The circuit as defined in claim 8, wherein the spool is in the second position during transient operation of the propeller pitch change mechanism.

10. The circuit as defined in claim 9, wherein during transient operation of the propeller pitch change mechanism, the spool increases an opening of the pitch port while simultaneously blocking the outlet port.

11. The circuit as defined in claim 8, wherein the spool is in the first position during steady-state operation of the propeller pitch change mechanism.

12. The oil system as defined in claim 1, wherein the spool is displaceable within the cavity to modulate or control a size of an opening of the pitch port and to control an opening of the outlet port.

* * * * *